United States Patent [19]
Andrews et al.

[11] Patent Number: 5,907,403
[45] Date of Patent: May 25, 1999

[54] OPTICAL DUAL FABRY-PEROT INTERFEROMETRIC STRAIN/ TEMPERATURE SENSOR, AND SYSTEM FOR SEPARATE READING THEREOF

[75] Inventors: Jeffrey Pratt Andrews, Abingdon; Robert Earl Pulfrey, Bel Air, both of Md.

[73] Assignee: Lockheed Martin Corp., Baltimore, Md.

[21] Appl. No.: 08/637,017

[22] Filed: Apr. 24, 1996

Related U.S. Application Data

[60] Provisional application No. 60/010,401, Jan. 22, 1996.
[51] Int. Cl.$^6$ ...................................................... G01B 9/02
[52] U.S. Cl. ........................... 356/352; 356/345; 356/35.5
[58] Field of Search ........................... 356/345, 352, 356/35.5

[56] References Cited

U.S. PATENT DOCUMENTS

| | | | |
|---|---|---|---|
| 4,861,136 | 8/1989 | Stone et al. | 356/352 |
| 5,276,501 | 1/1994 | McClintock et al. | 356/352 |
| 5,301,001 | 4/1994 | Murphy et al. | 365/35.5 |
| 5,359,405 | 10/1994 | Andrews | 356/35.5 |
| 5,682,237 | 10/1997 | Berk | 356/352 |

*Primary Examiner*—Robert Kim
*Attorney, Agent, or Firm*—W. H. Meise; S. A. Young

[57] ABSTRACT

A strain sensor has a first optical fiber (212) including first ($212e_1$) and second ($212e_2$) ends and also includes lead-in (12) and lead-out (16) optical fibers. One (12) of the lead-in and the lead-out fiber has a first end (12e) affixed to the first end of the first fiber, forming a first partially reflective surface (214). The other one (16) of the lead-in and lead-out fibers has a first end (16e) located at a second distance (S) from the second end ($212e_2$) of the first fiber (212). The sensor includes a glass tube (30), with a bore (32), affixed to at least the other one of the fibers, and holds the first end of the other one of the fibers to define coaxial partial reflectors (14, 18) at the second end ($212e_2$) of the first fiber and the first end (16e) of the other one of the fibers. In one embodiment, the one of the fibers is the lead-in fiber. In one embodiment, the bore (32) diameter of the glass tube (30) is large enough to accommodate the first, lead-in, and lead-out fibers, the first fiber is located within the bore, and the first ends of the lead-in and lead-out fibers are also within the bore, but portions of the lead-in and lead-out fibers remote from their first ends are without the bore of the tube (30). In this particular embodiment, the tube is affixed at its ends (34, 36) to the lead-in and lead-out fibers, so at least the first fiber (212) is free for axial motion within the bore of the tube.

7 Claims, 3 Drawing Sheets

OPTICAL DUAL FABRY-PEROT INTERFEROMETRIC STRAIN/ TEMPERATURE SENSOR, AND SYSTEM FOR SEPARATE READING THEREOF

CROSS-REFERENCE TO RELATED APPLICATIONS

This is a continuation of Provisional Application SN 60/010,401, filed Jan. 22, 1996.

FIELD OF THE INVENTION

This invention relates to optical strain sensors which are sensitive to temperature, and to Fabry-Perot interferometric sensors, and to systems for reading strain and temperature separately.

BACKGROUND OF THE INVENTION

Optical fiber sensors allow simultaneous measurements of a plurality of parameters, such as the combination of axial strain and temperature. It has proven to be difficult to make optical fibers which are insensitive to temperature, or which are self-compensating. The general problem in the prior art, then, is that of independently sensing the strain, or of separating the strain from temperature effects. In general, sensor systems capable of separation of the two effects have used sensors in the form of (a) a combination of interferometric and polarimetric sensors, (b) two interferometers along independent eigen axes, or (c) two Bragg gratings on a high-index optical fiber. These approaches to sensing have been found to be subject to large errors and instabilities, because the defining equations are not sufficiently independent.

Air gap Fabry-Perot sensors overcome many of the drawbacks of the abovementioned sensors. FIG. 1a illustrates a conceptual Fabry-Perot etalon 10, such as that described in U.S. Pat. No. 5,276,501, issued Jan. 4, 1994, in the name of McClintock et al. Etalon 10 includes a lead-in optical fiber 12 with an end or face 14, and another optical fiber 16 with an end or face 18, with a gap 20 therebetween. When light flows between fibers 12 and 16, Fresnel reflections occur at the ends 14 and 18, due to the change in index of refraction between the air of the gap and that of the optical fibers. The Fresnel reflections are partial, in that only a portion of the incident light is reflected, and another portion is transmitted past the glass/air interface. The reflection from end 18 of fiber 16 is delayed or phase-shifted relative to the reflection from end 14, because of the length S of gap 20. The reflection from face 18 is delayed by the round-trip transit time through the gap, corresponding to a distance 2S. A similar arrangement, using gradient-index (GRIN) lenses to reduce losses, is described in an article entitled FIBER COUPLING USING GRADED-INDEX ROD LENSES, by Palais, published in APPLIED OPTICS magazine, Vol 19, No. 12, Jun. 15, 1980. Those skilled in the art know that the length of the cavity, and changes in the cavity length, can be measured by various readout arrangements. As illustrated in FIG. 1a, fibers 12 and 16 are unsupported.

FIG. 1b illustrates a prior-art in-line Fabry-Perot etalon (EFPI) sensor 22 in which the fibers are held in position by an in-line tube, to define an intrinsic Fabry-Perot etalon (ILFE). In FIG. 1b, ILFE 22 is sensitive to strain in the axial direction. In FIG. 1b, glass tube 24 has an outer diameter substantially equal to that of the lead-in fiber 12 and the lead-out fiber 16, and also defines a bore 26. Partial reflections take place at that part of face 14 of fiber 12 which is within the bore, because of the glass/air interface within the bore. A similar reflection takes place at face 18 of fiber 16.

FIG. 1c illustrates a prior-art etalon, as described, for example, in U.S. Pat. No. 5,359,405, issued Oct. 25, 1994 in the name of Andrews, in which the fibers are held in position within the bore of a tube to define an extrinsic Fabry-Perot etalon (EFPI). Such a structure is termed a "Fizeau" sensor in U.S. Pat. No. 5,301,001, issued Apr. 5, 1994, in the name of Murphy et al. In FIG. 1c, a glass tube 30 has a bore 32 and first and second ends 34 and 36, respectively. Face 14 of lead-in optical fiber 12 is within bore 32 of tube 30, together with a portion of fiber 12, and face 18 of optical fiber 16 is also within bore 32. Faces 14 and 18 together define a multiple reflection etalon similar to that of FIG. 1a. As described in the Andrews patent, the fiber faces 14 and 18 have reflection magnitudes of about 4% if uncoated, and may be coated to change the reflection magnitude. The support of the fibers 12 and 16 within the bore 32 of tube 30 allows full utilization of the area of reflective surfaces 14 and 18. Fibers 12 and 16 are fastened to tube 30, as by fusion welds, at locations 38 and 40, which are near tube ends 36 and 38, respectively.

The arrangement of FIG. 1c allows strains in external tube 30 as a result of externally applied stresses to be effectively magnified, by comparison with the arrangement of FIG. 1b. More particularly, external force or stress applied axially to the tube 24 of FIG. 1b, as, for example by imbedding the tube in a structure to be measured, is applied across the length S of tube, and the resulting strain (deformation in the form of stretch or compression) is some constant K times S, or KS, where K depends upon the nature of the glass tube 30. This strain is measured across gap distance S in the arrangement of FIG. 1b. In the arrangement of FIG. 1c, on the other hand, the length of the tube 30 is Y times S, so the force tending to cause deformation is applied across a longer portion of the tube, and the resulting strain is correspondingly longer, namely Y times KS, or YKS, which is Y times greater than in the case of FIG. 1b. The greater strain, however, appears across the same gap length S, because fibers 12 and 16 are free to move within tube bore 32, being constrained only at or near the ends 34 and 36 of the tube 30. Consequently, a strain Y times that of FIG. 1b appears across the same gap length S in the arrangement of FIG. 1c, with the result of higher sensitivity in the form of more strain or motion of a given gap length for the arrangement of FIG. 1c by comparison with that of FIG. 1b. Optical fiber 12 is a single-mode fiber, and fiber 16 is either a single-mode or a multimode fiber.

When sensor 8 of FIGS. 1b or 1c are illuminated from one end, two Fresnel reflections are created at the reflective fiber faces. These two reflections return toward the source, and can be separated from the incident light by means of a directional coupler. The separated reflections can be evaluated to determine the dimensions S of the gap. A wavelength tuning method is described in the abovementioned Andrews patent.

As mentioned, sensors 16 of FIG. 1b and 28 of FIG. 1c, when connected to a readout system, are capable of measuring strain. The strain is manifested as a change in dimension S of cavity 20. Strain is defined as change in length divided by length, or $\Delta L/L$, and may be caused by either a physical force applied to the ends of the tube, or it may be caused by the temperature coefficient of physical expansion of the support tube 24 or 30. Without knowing the actual temperature of the sensor, then, it may not be possible to know the amount of change of dimension of the cavity which is due to external forces, rather than to temperature changes. The use of multiple measurement sensors in the same physical structure tends to weaken the structure, and the presence of the one sensor near another can itself affect the desired measurements. Improved sensors are desired.

SUMMARY OF THE INVENTION

A sensor according to an aspect of the invention includes a single-mode, optical first fiber with first and second ends. The first optical fiber has a particular length between its first and second ends. A lead-in or lead-out optical fiber (an optical second fiber) includes a first end. The first end of the second fiber is affixed to the first end of the first optical fiber, to thereby define a first partially reflective surface at the joined first ends of the first and second fibers. This junction may be made by fusion welding. The other one of the lead-in and lead-out fibers (an optical third fiber) has its first end located at a second particular length or distance from the second end of the first fiber, which thereby defines an air (or vacuum) gap or cavity, with partially reflective end faces. The sensor includes a glass tube which has a bore and a diameter. The glass tube is affixed to at least the third fiber, for holding the first end of the third fiber in a manner defining coaxial optical partial reflectors at the second end of the first fiber and at the first end of the third fiber. Thus, the sensor has three distinct reflective surfaces, namely at the junction of the first and second fibers, and at the glass/air interfaces between the first fiber and the cavity, and between the third fiber and the cavity. In a particular embodiment of the invention, the second fiber is the lead-in fiber, and it is a single-mode fiber.

In another embodiment, the bore of the glass tube has a diameter large enough to accommodate the first, second and third optical fibers, and the first optical fiber is located within the bore of the glass tube, with the first ends of the second and third fibers also located within the bore of the glass tube, but portions of the second and third fibers remote from the first ends thereof are without the bore of the glass tube. In a particular variant of this embodiment, the glass tube has ends, and is affixed, as by a fusion weld, at those ends to the second and third fibers, whereby at least the first fiber is free for axial motion within the tube.

An optical readout system according to the invention separately determines the temperature of the sensor, and the strain.

DESCRIPTION OF THE INVENTION

Figure 1A:
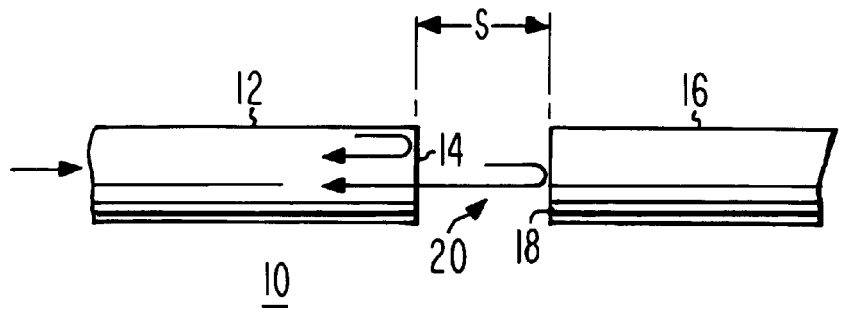
FIG. 1a illustrates a conceptual Fabry-Perot etalon sensor.
Figure 1B:
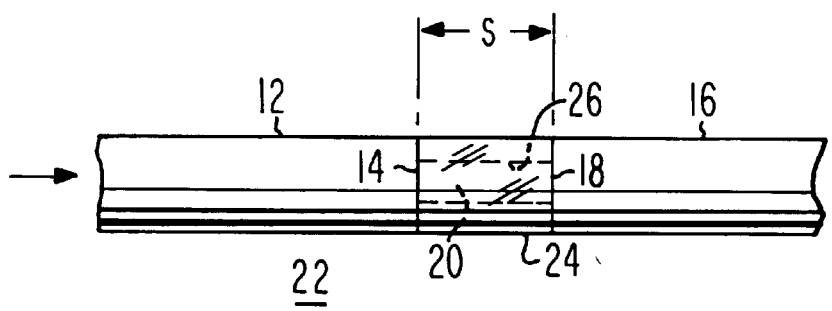
FIG. 1b illustrates a prior-art etalon in which the fibers are held in position by an in-line tube, to define an intrinsic Fabry-Perot etalon (ILFE)
Figure 1C:
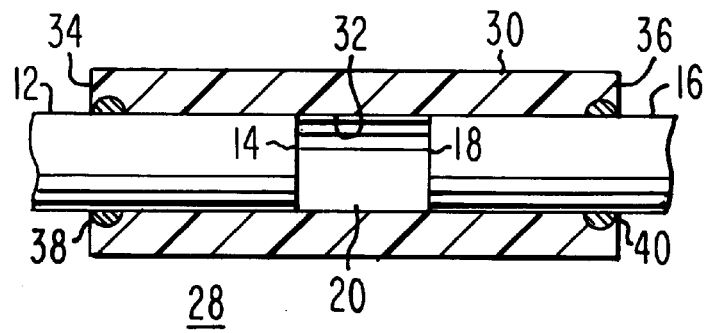
FIG. 1c illustrates a prior-art etalon in which the fibers are held in position within the bore of a tube to define an extrinsic Fabry-Perot interferometer (EFPI)
Figure 2A:
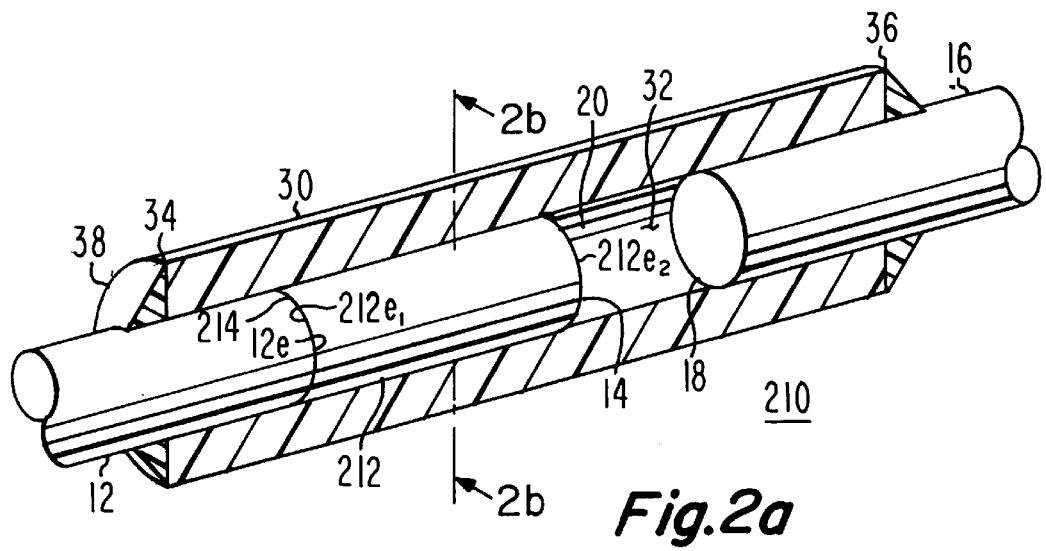
FIG. 2a is a perspective or isometric view, partially cut away to reveal interior details, of a sensor according to the invention.
Figure 2B:
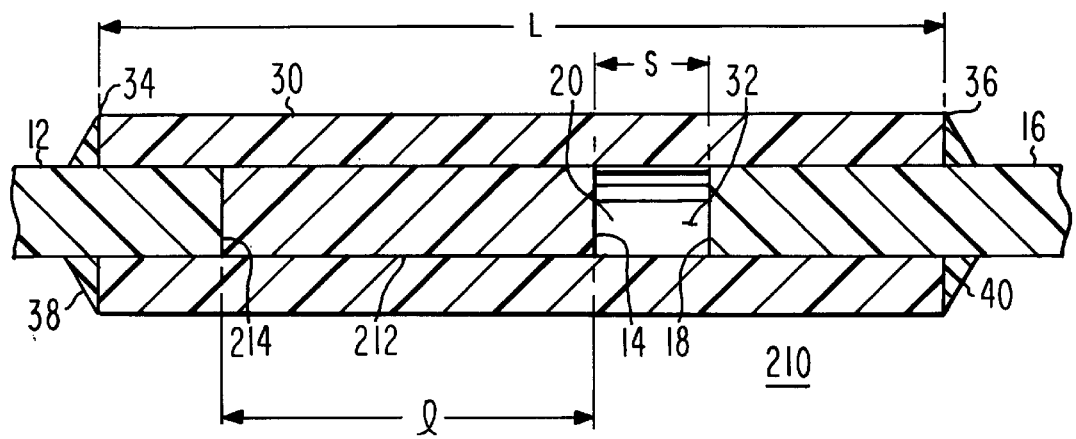
FIG. 2b is a side elevation view of the arrangement of FIG. 2a taken along section lines 2b—2b.

FIG. 2a is a perspective or isometric view, and FIG. 2b is a side elevation view, partially cut away to reveal interior details, of a sensor according to the invention. In FIGS. 2a and 2b, elements corresponding to the Extrinsic Fabry-Perot (EFPI) sensor of FIG. 1c are designated by like reference numerals. In FIGS. 2a and 2b, sensor 210 includes a single-mode lead-in optical fiber 12 with an end face 12e. A second single-mode fiber 212 has a first end face 212e, adjacent to end face 12e of lead-in optical fiber 12, and also has a second end face $212e_2$. First end face $212e_1$ of single-mode optical fiber 212 is bonded, as by a fusion weld, to end face 12e of lead-in optical fiber 12, to form a partially reflective interface or junction 214. In order to improve the magnitude of the reflection at interface 214, the surface of one or both of the adjacent fibers may be coated with a reflection-enhancing material. Second end $212e_2$ of optical fiber 212 is adjacent cavity 20, and the glass/air interface forms partially reflecting surface 14. Face 18 of lead-out optical fiber 16 also faces cavity 20, and forms a partially reflective air/glass interface therewith. Optical fiber 16 is either single-mode or a multimode fiber. A mounting tube 30 includes a bore 32, which is dimensioned to clear optical fibers 12, 16, and 212. Mounting tube 30 has a length L, which is selected to be longer than the sum of the length 1 of optical fiber 212 and the length S of gap 20, so that the ends 34 and 36 of tube 30 overlie portions of lead-in fiber 12 and lead-out fiber 16. The ends 34 and 36 are fastened or connected to optical fibers 12 and 16, as by welds or adhesive 38, 40. With this arrangement, the ends 12e and 16e of optical fibers 12 and 16, and all of optical fiber 212, are free to move within bore 32 of tube 30.

When stress is applied to tube 30 of FIGS. 2a and 2b, a strain occurs along length L of tube 30, which is transferred to cavity 20, to modify gap S. An applied stress has no effect on the length 1 of optical fiber 212, because it is free to move within bore 32. Consequently, the length 1 of fiber 212 is independent of stresses applied to the sensor 210. Thus, a stress causes a large change in the length S of the cavity, but no change in the length 1 of optical fiber 212. A temperature change, on the other hand, itself causes strain of cavity length S, but also results in a change in the optical length of optical fiber 212, due to (a) temperature-dependent change in length of optical fiber 212, and (b) temperature-dependent change in the index of refraction of optical fiber 212. The relative lack of temperature-dependent change in the index of refraction, and therefore of the optical length, of air cavity 20, together with the relative lack of sensitivity of fiber 212 to stress, allows the temperature to be determined independent of the strain, and therefore allows separation of stress and temperature effects on the sensor.

The simultaneous measurement of temperature and strain is possible because phase response of the air-gap between faces 14 and 18 is strongly responsive to strain but weakly responsive to temperature, while the phase response of the two discontinuities 14 and 214 separated by glass ("glass gap") is strongly sensitive to both temperature and temperature-induced strain. These sensitivities can be expressed mathematically for surface-mounted sensors by the phase-strain-temperature model for the air-gap as $$\Delta\phi^{ILFE} = 2\beta n_D(L\epsilon + S\xi^a \Delta T) \quad (1)$$

and for the glass gap as $$\Delta\phi^{IFPI} = 2\beta ln\Delta T(\alpha + \xi) \quad (2)$$

where $\Delta\phi^{ILFE}$ and $\Delta\phi^{IFPI}$ are the phase shifts caused in the air gap and glass gap sensors respectively due to the strain ($\epsilon$) and temperature ($\Delta T$), $\beta=2\pi/\lambda$, $\lambda$ is the operating wavelength, L is the gage length of the sensors, S is the air gap length, $n_0$, the refractive index of air in the glasss refractive index, $\alpha$ is the glass coefficient of thermal expansion, $\xi^a$, $\epsilon$ are the thermo-optic constants of air and fiber, l is the length of glass gap. All of the constants in equations (1) and (2) can be found in the literature or through direct measurement. Table I lists the constants and their values.

TABLE 1

| | |
|---|---|
| n | 1.458 |
| $n_0$ | 1.000 |
| $\xi$ | $8.916 \cdot 10^{-6}$ (° C.$^{-1}$) |
| $\xi^a$ | $0.112 \cdot 10^{-6}$ (° C.$^{-1}$) |
| $\alpha$ | $0.5 \cdot 10^{-6}$ (° C.$^{-1}$) |

A wavelength-tuned readout system, such as that described in the abovementioned McClintock et al. patent, allows reading the optical length of fiber 212 independently of the length of gap 20, so long as the lengths are sufficiently different so that they can be resolved. Since the optical length of fiber 212 depends only upon its temperature-induced strain and its temperature coefficient of index of refraction, and the length of the gap depends upon strain but not upon temperature effects on index of refraction, separation is possible.

Figure 3:
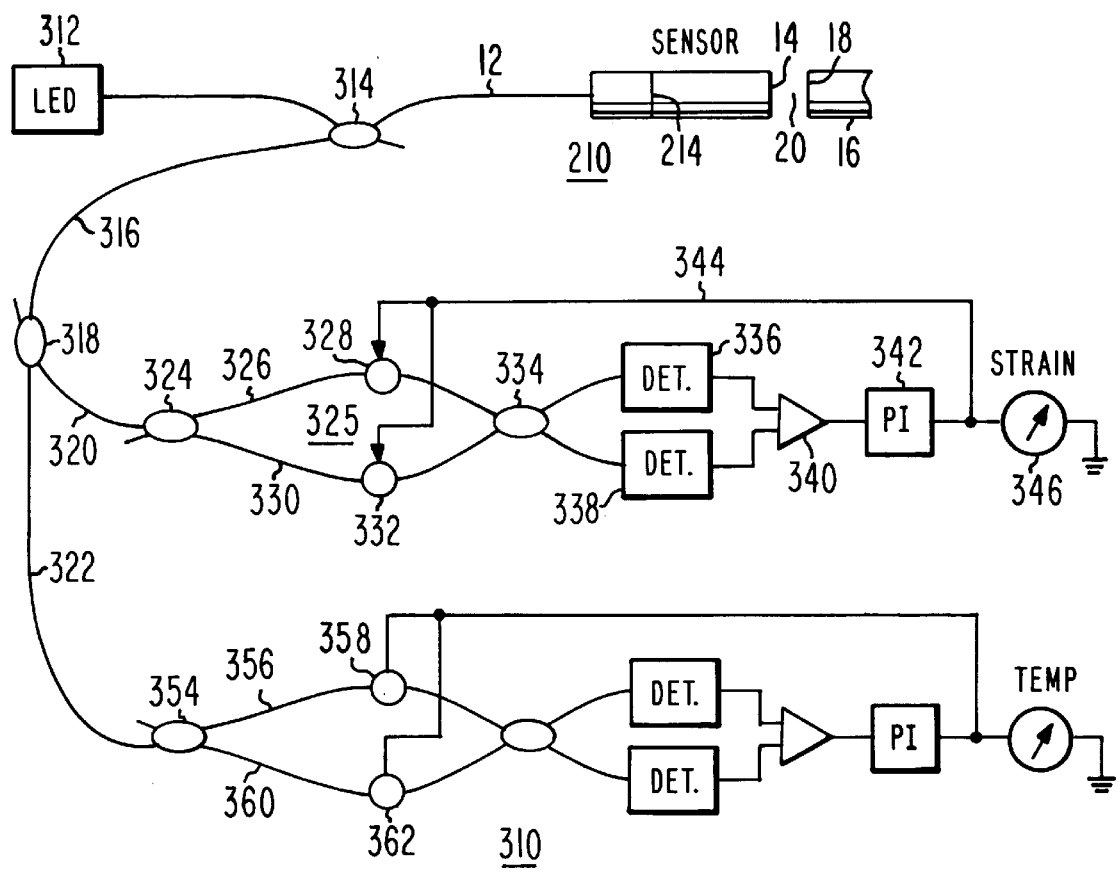
FIG. 3 is a simplified block diagram of a readout system according to the invention, for use with the sensors of FIGS. 2a or 2b.

FIG. 3 is a simplified block diagram of a readout system according to an aspect of the invention, for reading temperature and strain independently from the sensor of FIGS. 2a and 2b. This readout system uses a short-coherence-length light source, such as a light-emitting diode, together with a correlation scheme which allows determination of the optical length or separation between of two separate sets of reflections, so long as the sets differ sufficiently in length so that they can be resolved. In FIG. 3, a readout system 310 includes a light-emitting diode 312, which provides light by way of a directional coupler 314 to lead-in fiber 12 of sensor 210 of FIGS. 2a and 2b. As described at length above, sensor 210 produces three separate optical reflections, which return along fiber 12, and which are divided in coupler 314 into two portions, one of which propagates back to source 312 and is lost, and another portion which propagates along a fiber 316 to a further optical splitter 318, which again divides amplitude, and couples a portion of each of the three reflections onto fibers 320 and 322. That portion of the optical signal on fiber 320 is again divided in a splitter 324, and applied over two fiber paths 326 and 330 of an interferometer 325 to a combiner 334. Optical fiber 326 is wound about a piezoelectric cylinder 328, and fiber 330 is wound about another piezoelectric cylinder 332. Piezoelectric cylinders 328 and 332 change in diameter in response to control voltages applied thereto over a path 344, and therefore tend to affect the physical lengths of their respective fibers, and therefore affect the path lengths of their respective sides of the interferometer 325. The two output signals from combiner 334 of FIG. 3 are applied to individual optical detectors 336 and 338, which detect the optical power.

Thus, a strain sensor according to an aspect of the invention includes a first optical fiber (212) including first (212$e_1$) and second (212$e_2$) ends. The first optical fiber has a length defined by a first particular distance (L) between its first (212$e_1$) and second (212$e_2$) ends. The sensor also includes lead-in (12) and lead-out (16) optical fibers. One (12) of the lead-in and the lead-out fiber includes a first end (12e). The first end (12e) of the one of the lead-in (12) and lead-out (16) fibers is affixed to the first end (212$e_1$) of the first optical fiber (12), to thereby define a first partially reflective surface (214) at the first end (212$e_1$) of the first fiber (212) and the first end (12e) of the one (12) of the lead-in (12) and lead-out (16) fibers. The other one (16) of the lead-in (12) and lead-out (16) fibers has a first end (16e) located at a second particular distance (S) from the second end (212$e_2$) of the first fiber (212). The sensor further includes a glass tube (30), which has a bore (32) and a diameter. The glass tube (30) is affixed to at least the other one (16) of the lead-in (12) and lead-out (16) fibers, for holding the first end (16e) of the other one (16) of the lead-in (12) and lead-out (16) fibers in a manner defining mutually coaxial optical partial reflectors (14, 18) at the second end (212$e_2$) of the first optical fiber (212) and at the first end (16e) of the other one (16) of the lead-in (12) and lead-out (16) fibers. In a particular embodiment of the invention, the one (12) of the lead-in (12) and lead-out (16) fibers is the lead-in (12) fiber, and it is a single-mode fiber. In one embodiment, the bore (32) of the glass tube (30) has a diameter large enough to accommodate the first (212), lead-in (12), and lead-out (16) optical fibers, and the first optical fiber (212) is located within the bore (32) of the glass tube, and the first ends (12e, 16e) of the lead-in (12) and lead-out (16) fibers are also located within the bore (32) of the glass tube (30), but portions of the lead-in (12) and lead-out (16) fibers remote from the first ends (12e, 16e) thereof are without the bore (32) of the glass tube (30). In this particular embodiment, the glass tube (30) has ends (34, 36), and is affixed at those ends (34, 36) to the lead-in (12) and lead-out (16) fibers, whereby at least the first fiber (212) is free for axial motion within the bore (32) of the tube (30).

Other embodiments of the invention will be apparent to those skilled in the art. For example, the optical fibers may be selected for low loss at the optical wavelengths of the optical source, and they may be protected from environmental conditions by suitable coverings. While fusion welds have been described, adhesive junctions between fibers, and/or between fibers and support tubes, may be used.

What is claimed is:

1. A strain sensor, comprising:
   a first optical fiber including first and second ends, said first optical fiber having a length defined by a first particular distance between said first and second ends;
   lead-in and lead-out optical fibers, one of said lead-in and said lead-out fiber including a first end, said first end of said one of said lead-in and lead-out fibers being affixed to said first end of said first optical fiber, to thereby define a first partially reflective surface at said first end of said first fiber and said first end of said one of said lead-in and lead-out fibers, the other one of said lead-in and lead-out fibers having a first end located at a second particular distance from said second end of said first fiber;
   a glass tube including a bore, and first and second ends, and having a diameter large enough to accommodate said first, lead-in, and lead-out optical fibers, said first optical fiber being located within said bore of said glass tube, and said first ends of said lead-in and lead-out fibers also being located within said bore of said glass tube, but portions of said lead-in and lead-out fibers remote from said first ends thereof being without said bore of said glass tube, said glass tube being affixed at said first and second ends to said lead-in and lead-out fibers, for holding said first end of said other one of said lead-in and lead-out fibers in a manner defining mutually spaced-apart coaxial optical partial reflectors at said second end of said first optical fiber and at said first end of said other one of said lead-in and lead-out fibers, whereby at least said first fiber is free for axial motion within said bore of said tube.

2. An arrangement according to claim 1, wherein said one of said lead-in and lead-out fibers is said lead-in fiber, and wherein said lead-in fiber is a single-mode fiber.

3. A strain sensor, comprising:

a tube defining a bore, nd having first and second ends, and a particular length lying between said first and second ends of said tube, and also having a temperature coefficient of physical expansion;

a lead-in single-mode first optical fiber including a sensor end, a first length of said first optical fiber adjacent to said sensor end extending into said first end of said bore of said tube, and being located within said bore of said tube;

a length of a second optical fiber having an index of refraction which is sensitive to temperature, and including a first end fastened to said sensor end of said first optical fiber to form a partially reflective junction, and also including a second end, said length of said second optical fiber being located within said bore of said tube;

a third optical fiber including a sensor end said sensor end of said third optical fiber extending into said second end of said bore of said tube, and being located within said bore of said tube, said sensor end of said third optical fiber being spaced from said second end of said second optical fiber, to thereby define an optical cavity, with partially reflective ends, lying within said bore and between said sensor end of said third optical fiber and said second end of said second optical fiber;

first mechanical fastening means for mechanically fastening said first optical fiber to said first end of said tube, so that that portion of said lead-in optical fiber and said second optical fiber lying within said bore of said tube are free for axial movement within said bore of said tube, whereby the optical length of said second optical fiber changes as a function of the temperature coefficient of said refractive index and also as a function of its temperature coefficient of physical expansion;

second mechanical fastening means for mechanically fastening said third optical fiber to said second end of said tube, so that that portion of said third optical fiber lying within said bore of said tube is free for axial movement within said bore of said tube, whereby the combination of the temperature coefficient of physical expansion of said first, second and third optical fibers is similar to said temperature coefficient of physical expansion of said tube, whereby the temperature coefficient of physical expansion of said cavity, and of the optical path length of said cavity, corresponds to said temperature coefficient of physical expansion of said tube.

4. A sensor according to claim 3, wherein said second optical fiber is a single-mode fiber.

5. A sensor according to claim 3, wherein said third optical fiber is a single-mode fiber.

6. A sensor according to claim 3, wherein said second optical fiber is a single-mode fiber, and said third optical fiber is a multimode fiber.

7. An optical strain sensor, comprising;

a tube defining a bore having first and second ends, and a particular length lying between said first and second ends of said tube, said tube also having a temperature coefficient of physical expansion;

a lead-in single-mode first optical fiber including a sensor end, a first length of said first optical fiber adjacent to said sensor end extending into said first end of said bore of said tube, and being located within said bore of said tube;

a length of a second optical fiber having an index of refraction which is sensitive to temperature, and including a first end fastened to said sensor end of said first optical fiber to form a first partially reflective junction, and also including a second end, said length of said second optical fiber being located within said bore of said tube;

a third optical fiber including a sensor end, said sensor end of said third optical fiber extending into said second end of said bore of said tube, and being located within said bore of said tube, said sensor end of said third optical fiber being spaced from said second end of said second optical fiber, to thereby define an optical cavity, with partially reflective ends, lying within said bore and between said sensor end of said third optical fiber and said second end of said second optical fiber, whereby light propagating from said lead-in optical fiber through said glass tube generates a first reflection at said first partially reflective junction, a second reflection at said second end of said second optical fiber, and a third reflection at said sensor end of said third fiber;

first mechanical fastening means for mechanically fastening said first optical fiber to said first end of said tube, so that a portion of said lead-in optical fiber and of said second optical fiber lying within said bore of said tube are free for axial movement within said bore of said tube, whereby the optical length of said second optical fiber changes as a function of the temperature coefficient of said refractive index and also as a function of its temperature coefficient of physical expansion;

second mechanical fastening means for mechanically fastening said third optical fiber to said second end of said tube, so that a portion of said third optical fiber lying within said bore of said tube is free for axial movement within said bore of said tube, whereby the combination of the temperature coefficient of physical expansion of said first, second and third optical fibers is similar to said temperature coefficient of physical expansion of said tube, whereby the temperature coefficient of physical expansion of said cavity, and the optical path length of said cavity, corresponds to said temperature coefficient of physical expansion of said tube;

first optical phase detection means coupled to one of said lead-in and lead-out fibers, for determining the optical length of said cavity, which is equal to said physical length of said cavity, which physical length is dependent upon applied forces and upon temperature, but which has no temperature-dependent index of refraction;

second optical phase detection means coupled to said one of said lead-in and lead-out fibers, for determining the optical length of said second optical fiber, which optical length is dependent upon the index of refraction and the physical length of said second optical fiber, both of which are dependent upon temperature.

* * * * *